US011111400B2

United States Patent
Iacob et al.

(10) Patent No.: US 11,111,400 B2
(45) Date of Patent: Sep. 7, 2021

(54) MULTIMATERIAL POWDER WITH COMPOSITE GRAINS FOR ADDITIVE SYNTHESIS

(71) Applicant: H.E.F., Andrezieux-Boutheon (FR)

(72) Inventors: Constantin Iacob, St. Georges sur Fontaine (FR); Sébastien Bucher, Saint Etienne (FR); Fabrice Prost, Saint Etienne (FR); Christophe Heau, Saint Etienne (FR)

(73) Assignee: H.E.F., Andrezieux Boutheon (FR)

( * ) Notice: Subject to any disclaimer, the term of this patent is extended or adjusted under 35 U.S.C. 154(b) by 71 days.

(21) Appl. No.: 16/331,908

(22) PCT Filed: Sep. 8, 2017

(86) PCT No.: PCT/FR2017/052396
§ 371 (c)(1),
(2) Date: Mar. 8, 2019

(87) PCT Pub. No.: WO2018/046871
PCT Pub. Date: Mar. 15, 2018

(65) Prior Publication Data
US 2019/0194481 A1 Jun. 27, 2019

(30) Foreign Application Priority Data
Sep. 9, 2016 (FR) ...................................... 1658443

(51) Int. Cl.
*C09D 11/037* (2014.01)
*B01J 13/02* (2006.01)
(Continued)

(52) U.S. Cl.
CPC ............. *C09D 11/037* (2013.01); *B01J 13/02* (2013.01); *B22F 1/0014* (2013.01); *B33Y 70/00* (2014.12);
(Continued)

(58) Field of Classification Search
None
See application file for complete search history.

(56) References Cited

U.S. PATENT DOCUMENTS

| 2010/0255093 A1* | 10/2010 | Edgren | A61P 25/08 424/468 |
|---|---|---|---|
| 2011/0143029 A1 | 6/2011 | Chen et al. | |
| 2014/0079747 A1 | 3/2014 | Dihora et al. | |

FOREIGN PATENT DOCUMENTS

| CN | 1859973 A | 11/2006 |
|---|---|---|
| EP | 1462539 A1 | 9/2004 |

(Continued)

OTHER PUBLICATIONS

International Search Report and Written Opinion of the International Searching Authority issued on International International Application No. PCT/FR2017/052396 (dated Dec. 1, 2017) with partial English translation.
(Continued)

*Primary Examiner* — Colin W. Slifka
(74) *Attorney, Agent, or Firm* — Kenealy Vaidya LLP (57) ABSTRACT

Some embodiments are directed to a multimaterial powder used in the field of metallurgy and plasturgy. The multimaterial powder includes support particles having a median particle size distribution between 1 μm and 100 μm and functionalising particles having a median particle size distribution that is a factor of 10 to 1000 lower relative to the support particles. The powder is characterised in that the support particles and the functionalising particles form composite grains having a core-shell structure that each have a core formed by a support particle, and a shell, that covers between 10 and 100% of the surface of the support particle and which is formed by at least one surface layer of the functionalising particles.

13 Claims, 4 Drawing Sheets (51) Int. Cl.
    *B33Y 70/00*     (2020.01)
    *B22F 1/00*     (2006.01)
    *C09D 11/102*     (2014.01)
    *B22F 9/04*     (2006.01)

(52) U.S. Cl.
    CPC .............. *C09D 11/102* (2013.01); *B22F 9/04* (2013.01); *B22F 2301/052* (2013.01); *B22F 2301/10* (2013.01); *B22F 2301/15* (2013.01); *B22F 2304/10* (2013.01)

(56) References Cited

FOREIGN PATENT DOCUMENTS

| FR | 2982865 A1 | 5/2013 |
|---|---|---|
| JP | H03-94078 A | 4/1991 |
| JP | 2010525930 A | 7/2010 |
| JP | 2010232225 A | 10/2010 |
| JP | 2016093840 A | 5/2016 |
| JP | 2016156068 A | 9/2016 |
| WO | WO2015/054493 A1 | 4/2015 |
| WO | WO-2015054493 A1 * | 4/2015   ............... B22F 9/16 |
| WO | 2016114189 A1 | 7/2016 |

OTHER PUBLICATIONS

Butscher, A., et al., "Structural and material approaches to bone tissue engineering in powder-based three-dimensional printing," Acta Biomaterialia 2010;7(3):907-920.

May 25, 2021 Notice of Reasons for Rejection issue in corresponding Japanese Patent Application No. JP2019-510332 (with English Translation).

Jan. 28, 2021 Notification of First Office Action issued in corresponding Chinese Patent Application No. CN1859973A (English translation).

* cited by examiner

MULTIMATERIAL POWDER WITH COMPOSITE GRAINS FOR ADDITIVE SYNTHESIS

CROSS REFERENCE TO RELATED APPLICATIONS

This application is a national phase filing under 35 C.F.R. § 371 of and claims priority to International Patent Application No. PCT/FR2017/052396, filed on Sep. 8, 2017, which claims the priority benefit under 35 U.S.C. § 119 of French Application No. 1658443, filed on Sep. 9, 2016, the contents of which are hereby incorporated in their entireties by reference.

BACKGROUND

The presently disclosed subject matter relates to the manufacture of multimaterial powders used in different fields (metallurgy, plasturgy, etc.) for applications in the techniques of additive synthesis and surface treatments by spraying.

The term additive synthesis techniques relates to, in terms of the presently disclosed subject matter, any technique that makes it possible to obtain three-dimensional objects by consolidation of powders. Mention can be made in particular as non-limiting examples: 3D printing techniques (SLM, SLS, etc.), injection techniques (PIM, MIM), powder spraying techniques (cold spray, D-gun, etc.) and the conventional compacting/sintering techniques.

Currently there are as multimaterial powders either mixtures of powders of a different nature with a more or less homogeneous dispersion of the constituents according to the method of development, or alloy powders wherein the various elements may be in the form of solid solutions and/or defined compounds. The methods for synthesising such powders are relatively well known.

The technique of spraying a molten metal makes it possible in particular to obtain dense powders with spherical morphology. However, the materials obtained via this technique are either pure elements, or single-phase alloys of miscible elements such as, for example, certain steels, alloys of nickel, aluminium or titanium. These powders today form most of the offering for applications in additive manufacturing.

The technique via co-grinding (mechanical synthesis) makes it possible to produce multimaterial powders by intimately mixing under high energy, assisted by grinding beads, powders of different natures, such as described in U.S. Pat. Nos. 3,816,080, 3,591,362 and 4,706,894. Via this method, it is possible to obtain composite grains with a wide latitude of composition. However, the morphology and/or the particle size distribution of the powders obtained by this embodiment are not favourable for the application thereof in additive manufacturing. In addition, the grains obtained via this technique are formed of a more or less homogeneous dispersion of the various constituents and do not have the structure of a functionalised core on the surface.

The spray-drying technique also makes it possible to produce multimaterial powders by carrying out the spraying and the drying of a suspension that includes powders, of a solvent and of an organic binder, such as described in U.S. Pat. Nos. 5,122,182, 3,617,358 and 4,915,733. Composite grains coming from the agglomeration are thus obtained, via the organic binder which plays the role of adhesive, of the elemental powders present in the suspension. The grains obtained by this embodiment have a spherical morphology. However, their intragranular porosity, as well as the presence of organic binders make them improper for use in additive manufacturing. For this embodiment, it is possible to add a step of debinding and densification of the particles by various techniques based on an increase in temperature of the particles following the spraying/drying operation. It is then possible to obtain composite grains that are sufficiently dense and spherical that can be used in methods of surface treatment by spraying or methods of manufacturing by additive synthesis. However, the grains thus obtained are agglomerates formed from a non-homogenous dispersion of the various constituents and do not have the structure of a functionalised core on the surface.

Moreover, the dry deposition technologies such as chemical vapour deposition (usually designated by the acronym CVD) or physical vapour deposition (usually designated by the acronym PVD) can also be used on granular substrates to synthesise multimaterial powders. These technologies are then generally combined with methods that make it possible to implement devices that are able to place the granular substrates in movement such as fluidised beds, rotating reaction chambers or vibrating plates, such as is in particular taught by U.S. Pat. No. 7,632,355. With such methods, a deposition can be obtained on the surface of the grains. The PVD technology is highly limited in that it does not make it possible to be able to carry out the treatment of fine particles (of which the diameter is less than 100 µm). It is also highly limited in terms of functionalising rates for these reasonable treatment durations. The CVD technology is not, in most cases, technically or economically favourable if the toxicity and the cost of the precursors used are considered.

Finally, it is possible to synthesise multimaterial grains by surface treatment of support grains via wet chemical deposition as mentioned in U.S. Pat. Nos. 6,372,346, 5,064,463 and 4,309,457. In this case a deposition can be obtained on the surface of the grains. However, these embodiments generate substantial quantities of discharges that are harmful to the environment, and may require the use of expensive and dangerous chemical reagents, which substantially complicates the industrial development of these synthesis pathways. These techniques make it possible to associate at the scale of the grain different materials.

However, it may be necessary to have powders wherein different materials are associated at the scale of the grain, so as to make possible and facilitate the manufacture of a large variety of alloys, pseudo-alloys, composites, and cermets.

SUMMARY

For this purpose, the Applicant has developed a method that makes it possible to obtain composite grains obtained by functionalising the surface of grains or support particles by additive elements in granular form in order to obtain a microstructure in strata.

The advantages of being able to have such composite grains are multiple: in order to facilitate the implementation thereof, by avoiding the simple mixing of support elements and additive elements (instead of the functionalising of the first by the second), which generally generates problems of homogeneity and segregation during the storage or during the use thereof, as the composition is obtained at the scale of the grain; in order to substantially improve the homogeneity of the material and the reproducibility of the methods for forming these powders; in order to prevent the intragranular porosity and obtain particular advantageous microstructures of the material produced from these functionalised grains, in order to facilitate the sintering process in the liquid phase and the diffusion kinetics by functionalising, for example, support particles with a high melting point by functionalising particles with a low melting point. This example is particularly well suited for the manufacture of cermets, and in order to facilitate the process of deformation in the solid phase so as to improve the densification of coatings produced by praying: mention can be made in particular of the case of cold spray where a fragile support particle is functionalised by ductile support particles that provide the plastic deformation may be required to obtain a dense and adherent deposition.

More particularly, this presently disclosed subject matter therefore has for an aspect a multimaterial powder comprising support particles having a median particle size distribution d50 between 1 µm and 100 µm and functionalising particles having a median particle size distribution d50 that is a factor of 10 to 1000 lower relative to the support particles, said powder being characterised in that said support particles and said functionalising particles form composite grains having a core-shell structure that each have: a core formed by a support particle, and a shell, that covers between 10 and 100% of the surface of the support particle and which is formed by at least one surface layer of said functionalising particles.

The advantages offered by the shell including at least one surface layer of functionalising particles are in particular linked: on the one hand to the increase in the specific surface area of the composite grains thus formed, thus inducing better reactivity during sintering, and but also to the increase in the apparent and tapped density of the powder bed favouring a rapid densification during the fusion of the particles in additive manufacturing.

In the presently disclosed subject matter, the ranges of particle size distribution claimed correspond to a given interval d10-d90, by making the hypothesis that the multimaterial powder according to the presently disclosed subject matter has a distribution in number.

The term median particle size distribution d50 (or median diameter d50) relates to, in terms of the presently disclosed subject matter, the dimension below which 50% of the particles are located.

Advantageously, the functionalising particles have a median particle size distribution d50 greater than or equal to 100 nm, which has the consequence that the shell has a thickness greater than or equal to 100 nm. This size of functionalising particles makes it possible in particular to limit the problems of hygiene and safety, linked to the toxicity of the nanoparticles, during the manipulations thereof.

In a possible embodiment, the proportion of the support particles covered by the functionalising layer can be between 0.8 and 1, and between 0.9 and 1.

The term proportion of coated support particles relates to, in terms of this presently disclosed subject matter, the ratio between the number of functionalised particles and the number of total particles for a sample of multimaterial powder. This proportion is determined by analyses of images taken with a microscope of a population of multimaterial grains.

The advantage offered by a proportion of coated support particles greater than 0.9 is linked to the homogeneity of the microstructure on the scale of the grains. It guarantees that all of the latter have indeed been functionalised and in an equivalent manner. This characteristic has a direct impact on the absence of microstructural defects of the materials developed from the powders and therefore on the performance thereof; it also provides a serious guarantee as to the reproducibility of their characteristics.

Possibly, the total roughness Rt of the surface of the functionalising layer at the scale of the grain can be less than 10 µm, and possibly between 0.1 and 5 µm.

A rough surface typically includes asperities called "peaks" and cavities called "hollows".

The term total roughness Rt relates to, in terms of the presently disclosed subject matter, the largest drop between the highest top of a peak and the lowest bottom of a hollow.

The total roughness of the functionalising layer on the scale of the particle is determined by analyses of images of grains as a cross-section, taken with the microscope.

The advantage offered by a total roughness of the functionalising layer at the scale of the grain less than 10 µm is linked to the flow characteristics of the support particle that could be deteriorated following the functionalising treatment. Indeed, an excessive total roughness on the scale of the particle results in a decrease in the flowability of the powder and makes the use thereof difficult in the technologies of additive manufacturing and of thermal spraying where the flow characteristics of powders are essential parameters. On the other hand, a total roughness close to zero is not desired if consideration is given to the decrease in the specific surface that is associated with it, for a given particle size distribution and a morphology of support grains.

Advantageously, the median particle size distribution d50 of the support particles can be between 1 and 45 µm, with these values able to correspond respectively to a possible dimension d10 of 1 µm and a dimension d90 of 45 µm.

A particular way, the median particle size distribution d50 of the support particles can be between 10 and 45 µm, which corresponds to a particle size distribution that is particularly well suited for the methods of additive manufacturing.

Composite grains can have an irregular morphology, with a form factor greater than 1 or a substantially spherical morphology, with a form factor close to 1.

The term form factor relates to, in terms of the presently disclosed subject matter, the ratio between the size of the axis of the largest dimension, referred to as the main axis, and the size of the axis of the smallest dimension, referred to as the secondary axis, of the particle. The composite grains according to the presently disclosed subject matter can have a substantially spherical morphology.

In terms of support particles that can be used in the framework of the presently disclosed subject matter, mention can be made in particular of metallic, ceramic or organic particles.

In terms of functionalising particles that can be used in the framework of the presently disclosed subject matter, mention can be made in particular of ceramic, and/or metallic, and/or organic particles and/or particles that include at least one element chosen from the group comprising boron, carbon, oxygen and/or nitrogen.

In terms of composite grains according to the presently disclosed subject matter, mention can be made in particular of ceramic grains functionalised by a metal for the manufacture of cermets, such as for example: WC/Co, WC/Cu, WC/NiCr, TiC/Ni, B4C/Al, $Fe_xN_y$/Ni, Feα(N)/Ni, etc., metallic grains functionalised by a ceramic for the production of ceramic matrix composites (CMC), such as for example: Ti/ZrB2, Ti/TiC, Ti/SiC, Ti/$ZrB_2$/SiC Al/SiC, Fe/SiC, TA6V/$ZrO_2$, Al6061/TiC/WC etc, metallic grains functionalised by a metal for the manufacture of alloys, intermetallics and pseudo-alloys, such as for example:

W/Cu, W/Ni, Ti/Al, Ti/APC, Al/Cu, Al/Zn, Cu/Ni, Ti/AgCu, Ti/Mo, Mg/TiNi, Al/TiNi, Al6061/TiNi/SiC etc, ceramic grains functionalised by a ceramic, such as for example: $ZrB_2/SiC$, $Al_2O_3/SiO_2$, $Si_3N_4/SiC$ etc, organic grains functionalised by a metal for the manufacture of functional composites, such as for example: PA/Ag, PEKK/Ag, PTFE/Ag, PE/Ni etc, and metallic or ceramic grains functionalised by an organic material, such as for example $Fe_3O_4$/PA, C/PEKK, Cu/PE etc.

The presently disclosed subject matter also has for an aspect using the multimaterial powder according to the presently disclosed subject matter as a material that can be used for forming techniques by sintering such as additive synthesis and/or for surface treatment by spraying, such as flame spraying, HVOF, plasma spraying or cold spray.

The presently disclosed subject matter further has for an aspect a method for producing a powder according to the presently disclosed subject matter (a particular embodiment) including the introduction, into a circulating fluidised-bed reactor, of support particles in order to stir them via pneumatic and/or hydraulic or mechanical actions, and increase them in temperature using heating resistances the producing of a suspension of the functionalising particles in a mixture of an organic solvent and organic binder, then the grafting, in the reactor, of functionalising particles on the support particles by spraying the suspension on the support particles in fluidisation, and the heat treatment of the functionalised particles by an increase and a maintaining of the temperature in the fluidised-bed reactor.

The support particles and the functionalising particles, implemented in the method according to the presently disclosed subject matter for the purpose of obtaining composite grains forming the powder according to the presently disclosed subject matter, are such as defined hereinabove.

The term circulating fluidised bed relates to, in terms of the presently disclosed subject matter, a fluidised-bed reactor provided with a system that makes it possible on the one hand to trap the particles in the upper portion thereof and on the other hand to reintroduce them into the lower portion thereof. Such a reactor can operate in two-phase (solid/gas) or three-phase (solid/gas/liquid) mode. It can be in addition advantageously assisted by cold plasma torches at atmospheric pressure, so as, for example, to facilitate diffusion treatments of heteroatoms such as nitrogen, carbon, boron and oxygen.

The presently disclosed subject matter also has for an aspect a method for producing a powder according to the presently disclosed subject matter (another embodiment) wherein is used as a reactor a high-energy mechanical reactor specifically designed to implant functionalising particles on the surface of support grains.

In such an embodiment, the method unfolds as follows: introducing into the reactor of the support particles and functionalising particles, and grafting in the reactor of the functionalising particles on the support particles by a mechanical action at a temperature between 0° C. and +150° C., and possibly at a temperature between 10° C. and 80° C.

The support particles and the functionalising particles, implemented in this method according to the presently disclosed subject matter for the purpose of obtaining composite grains forming the powder according to the presently disclosed subject matter, are also such as defined hereinabove.

Advantageously, the method according to the presently disclosed subject matter can further include, after the step of grafting, a step of heat and/or surface treatment of the composite grains, using a circulating fluidised bed such as defined hereinabove.

Advantageously, the method according to the presently disclosed subject matter can further include, in the case where the composite grains would not have a spherical morphology, a step of spheroidisation said grains by a hot plasma fluidised bed.

BRIEF DESCRIPTION OF THE FIGURES

Other characteristics and advantages of the presently disclosed subject matter shall appear more clearly when reading the following description given for the purposes of information and in a non-limiting manner and in reference to the accompanying figures wherein

FIGS. 3A to 6B are photographs taken with a scanning electron microscope (SEM) of composite grains according to the presently disclosed subject matter.

FIGS. 3A to 7B are commented on in the examples hereinafter.

The identical elements shown in FIGS. 1 and 2 are identified by identical numerical references.

DETAILED DESCRIPTION OF EXEMPLARY EMBODIMENTS

Figure 1:
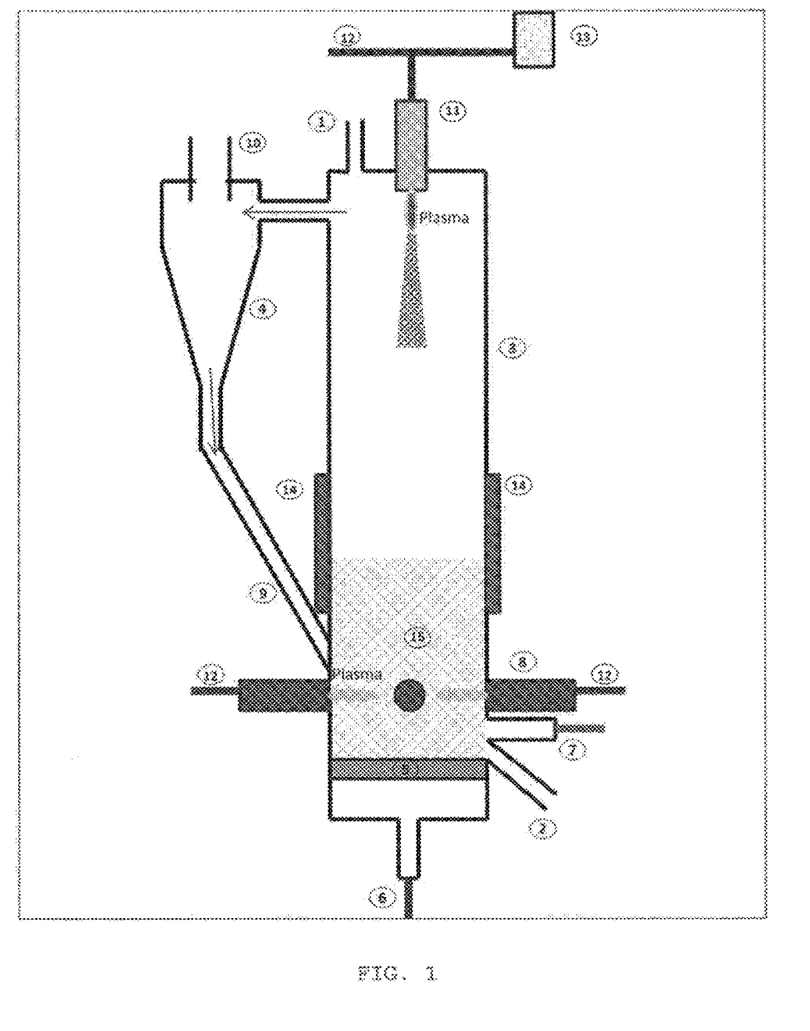
FIG. 1 shows a block diagram of the device used for the implementation of the method according to the presently disclosed subject matter according to an embodiment (fluidised-bed reactor).

FIG. 1 shows a block diagram of the device used for implementing the method according to the presently disclosed subject matter according to an embodiment (circulating fluidised-bed reactor). It includes the following elements: duct 1 for filling the reactor, duct 2 for emptying the reactor, cylindrical reaction enclosure 3, cyclone 4, porous plate 5, duct for supplying 6 fluidisation gas, spraying nozzle, four cold plasma torches 8, duct 9 for circulating the powder, duct 10 for exhausting gases, hot plasma torch 11, supply 12 with plasma gas, supply 13 with powder, heating resistance 14, and powder bed 15.

Figure 2:
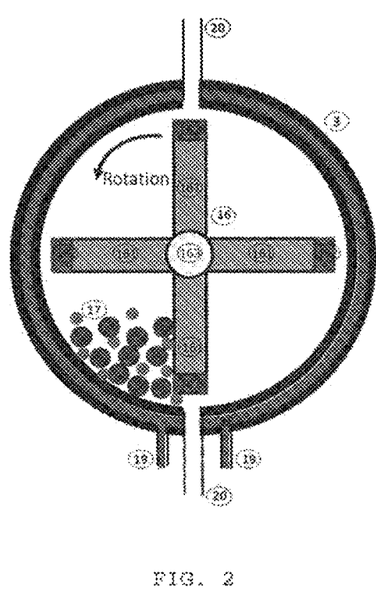
FIG. 2 shows a block diagram of the device as a cross-section used for the implementation of the method according to the presently disclosed subject matter according to an embodiment (grinding device).

FIG. 2 shows a block diagram of the device as a cross-section used for implementing the method according to the presently disclosed subject matter according to another embodiment (mechanical device). It includes the following elements: cylindrical enclosure 3, rotor 16 including: shafts 161, compression parts 162, fastening axis 163, mixtures 17 of support powder and functionalising, double shell 18 for the circulation of the cooling water, ducts 19 for the inlet and outlet of the cooling water, and ducts 20 for loading and unloading powders.

The presently disclosed subject matter is also shown in more detail in the following examples. In these examples, unless mentioned otherwise, all of the percentages and portions are expressed in weight percentages.

Example 1

A tungsten carbide powder with a particle size distribution d50 of 10 μm is functionalised using a cobalt powder with a particle size distribution d50 of 0.9 μm.

The operation is conducted according to another embodiment.

Figure 3A:
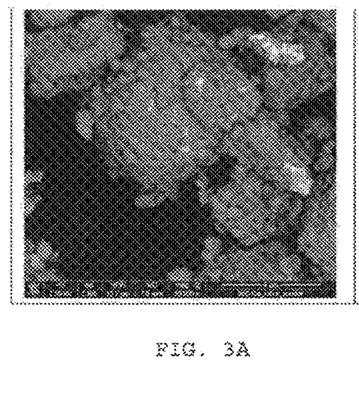

The powders are introduced into the high-energy mechanical device in a weight ratio of 80% WC and 20% Co. A cooling system by recirculation of water makes it possible to maintain the reaction chamber at 20° C. The enclosure is purged by argon in order to carry out the operation in an inert atmosphere. The end of the compression part is adjusted by a distance between 1 and 3 mm from the wall of the enclosure. The latter is set in rotation at a speed between 4000 and 6000 rpm, for a reaction time between 30 min and 60 min. The temperatures measured inside the enclosure are between 50 and 80° C. The composite powder thus obtained, shown in FIG. 3A, includes grains of tungsten carbide functionalised on the surface by grains of cobalt that cover more than 90% of the surface of the support particles.

Example 2

The same tungsten carbide powder as in the example 1 is functionalised using a copper powder with a particle size distribution d50 of 0.9 μm, according to the same operating parameters as in the example 1.

Figure 4A:
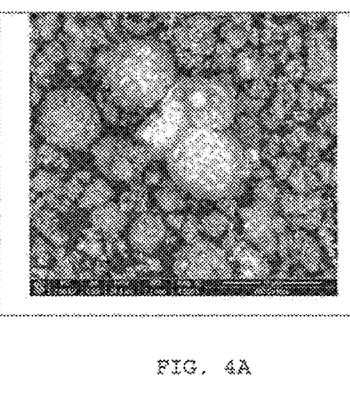

The composite powder thus obtained, shown in FIG. 4A, is formed of grains of tungsten carbide functionalised on the surface by grains of copper covering more than 60% of the surface of the support particles.

Example 3

An aluminium powder of a particle size distribution d50 of 40 μm is functionalised using a silicon carbide powder with a particle size distribution d50 of 3.5 μm.

The operation is conducted according to the same operating parameters as in the example 1.

The powders are introduced into the high-energy mechanical device in a weight ratio of 85% Al and 15% SiC.

Figure 3B:
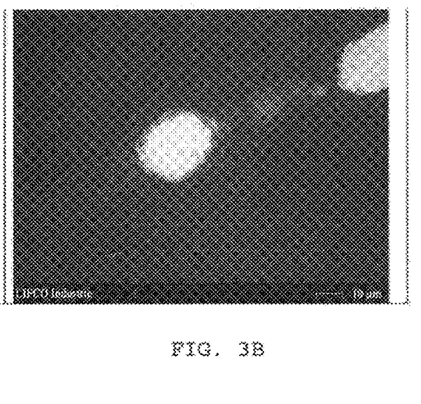

The composite powder thus obtained, shown in FIG. 3B (cross-section view), includes grains of aluminium functionalised on the surface by grains of silicon carbide forming a layer greater than 1 μm.

Example 4

A cobalt alloy powder (stellite) with a particle size distribution centred on 50 μm is introduced into a circulating fluidised bed, in accordance with an embodiment of the method according to the presently disclosed subject matter.

The powder is put into fluidisation by nitrogen under a flow rate of gas between 1000 and 1500 l/h. The powder is heated to a temperature between 150 and 200° C. An aqueous suspension of a nickel powder, with a particle size distribution centred on 2 μm, to which is added polyvinyl alcohol as an organic binder, is introduced into the enclosure of the fluidised bed by spraying using a spraying nozzle. Nitrogen is used as a spraying gas, at a pressure between 3 and 8 bars, and for a flow rate between 300 and 700 l/h. The suspension is pumped at flow rates between 0.8 and 1.2 l/h. At the end of the spraying operation, the powder is heated to a temperature between 250° C. and 350° C., corresponding to a first level of debinding.

The latter then is subjected to a diffusion heat treatment at a temperature between 500° C. and 700° C. The powder is finally cooled and conditioned.

Figure 5A:
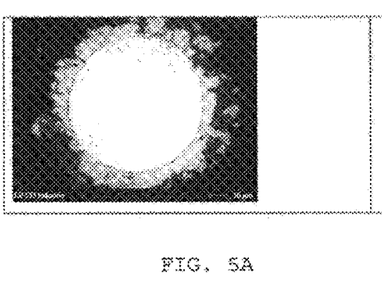

A cobalt alloy powder functionalised by a layer of nickel that has a thickness greater than 2 μm, as shown in FIG. 5a (cross-section view) is thus obtained.

Example 5

According to the same embodiment as in the example 4 (according to the an embodiment of the method according to the presently disclosed subject matter), the same cobalt alloy powder is functionalised by copper by using a copper powder with a particle size distribution centred on 5 μm.

In this case, the suspension of the copper powder is produced in an organic solvent by using the polyvinyl acetate as an organic binder. During the spraying operation, the cobalt alloy powder is maintained in fluidisation at a temperature between 80 and 150° C. The functionalised powder then is subjected to the same heat treatment cycles as hereinabove.

Figure 5B:
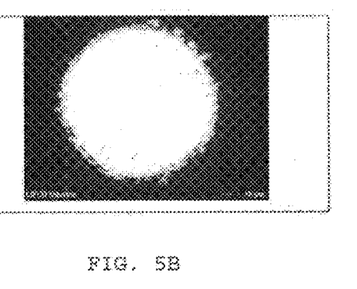

A cobalt powder functionalised by a layer of copper of a thickness greater than 1 μm, such as shown in FIG. 5b (cross-section view) is thus obtained.

Example 6

Figure 4B:
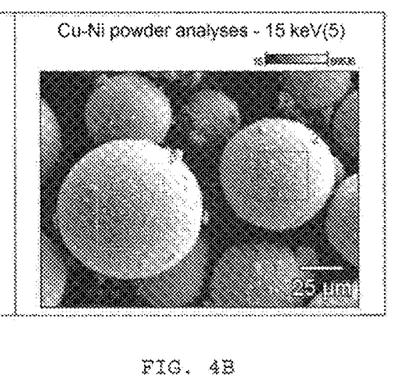

According to the same embodiment (an embodiment of the method according to the presently disclosed subject matter) and the same operating parameters as in the example 4, a copper spherical powder with a particle size distribution centred on 40 μm (d50) is functionalised by nickel covering more than 95% of the surface of the support particles, such as shown in FIG. 4b.

Example 7

A polyamide powder (PA) with a particle size distribution d50 of 60 μm is functionalised using a silver powder with a particle size distribution d50 of 2 μm.

The operation is conducted according to another embodiment of the method according to the presently disclosed subject matter.

The powders are introduced into the high-energy mechanical device in a weight ratio of 93% of PA and 7% of silver.

A system of cooling via recirculation of water allows for a cooling of the reaction chamber. The end of the compression part is adjusted to a distance between 1 and 3 mm from the wall of the enclosure. The latter is set into rotation at a speed between 3000 and 5000 rpm, for a grinding time between 10 min and 30 min. The temperatures measured inside the enclosure are between 20 and 50° C.

Figure 6A:
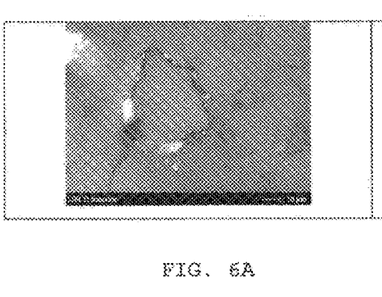
Figure 6B:
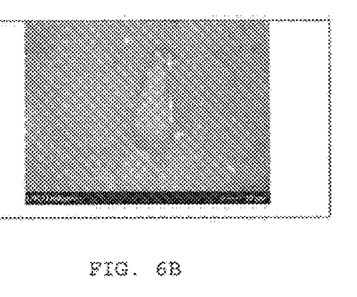

The composite powder thus obtained, shown in FIGS. 6A&B, includes grains of polyamide functionalised on the surface by grains of silver covering more than 10% of the surface of the support particles.

Example 8

Figure 7A:
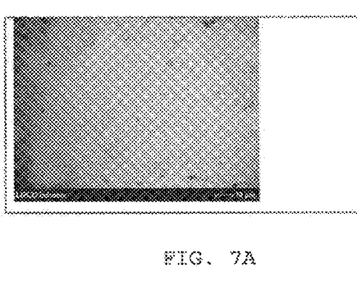
FIGS. 7A and 7B are photographs taken with an optical microscope showing the micrography as a cross-section of a composite Iron-Copper material developed via compacting/sintering, from a conventional mixture of iron and copper (FIG. 7A) and from an iron powder functionalised with copper (FIG. 7B).
Figure 7B:
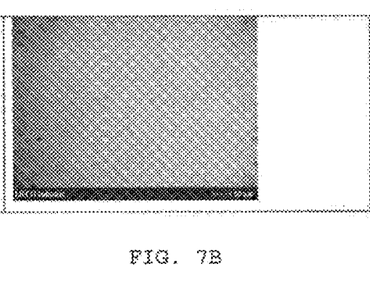

FIGS. 7a and 7b are photographs taken with the optical microscope showing the micrography as a cross-section of a composite Iron-Copper material developed via compacting/sintering, on the one hand from a conventional mixture of iron and copper (as shown in FIG. 7a) and on the other hand from an iron powder functionalised with copper (as shown in FIG. 7a).

The powders are compressed beforehand in a matrix under a uniaxial press at 700 MPa, then the tablets obtained are sintered in a controlled atmosphere at 1120° C.

In particular, FIG. 7A shows the microstructure of the material obtained from a conventional mixture of these iron (d50 of 50 µm) and copper (d50 of 5 µm) powders.

FIG. 7B shows the microstructure of the same material obtained from a copper functionalised iron powder in accordance with the same embodiment of the method according to the presently disclosed subject matter as in the example 5.

A significant difference between the two microstructures is observed visually: in the case of a microstructure obtained from the mixture of powders (shown in FIG. 7a), a non-homogeneous distribution of the constituents is noted, while in the case of a microstructure obtained from the functionalised powder (shown in FIG. 7b), a particular microstructure is observed formed from a matrix of copper interconnected with a homogeneous dispersion of grains of iron.

The invention claimed is:

1. A multimaterial powder for use in metallurgy and plasturgy, comprising:
    support particles having a median particle size distribution between 1 µm and 100 µm and functionalising particles having a median particle size distribution that is a factor of 10 to 1000 lower relative to the support particles,
    the powder being characterised in that the support particles and the functionalising particles form composite grains having a core-shell structure that each have
    a core formed by a support particle, and
    a shell, that covers between 10 and 100% of the surface of the support particle and which is formed by at least one surface layer of the functionalising particles,
    wherein the total roughness of the surface of the functionalising layer at the scale of the grain is less than 10 µm.

2. The multimaterial powder according to claim 1, wherein the functionalising particles have a median particle size distribution greater than or equal to 100 nm.

3. The multimaterial powder according to claim 1, wherein the proportion of the support particles covered by the functionalising layer is between 0.8 and 1.

4. The multimaterial powder according to claim 1, wherein the median particle size distribution of the support particles is between 1 and 45 µm.

5. The multimaterial powder according to claim 1, wherein the composite grains have a spherical morphology.

6. The multimaterial powder according to claim 1, wherein the support particles are metallic, ceramic or organic particles.

7. The multimaterial powder according to claim 1, wherein the functionalising particles are ceramic, and/or metallic, and/or organic particles and/or particles that include at least one element selected from the group consisting of boron, carbon, oxygen and/or nitrogen.

8. The multimaterial powder according to claim 1, including a material for additive synthesis and/or for surface treatments by spraying.

9. A method for producing the multimaterial powder according to claim 1, the method comprising:
    providing a circulating fluidised-bed reactor as a reactor;
    introducing the support particles are introduced into the reactor in order to stir them and heat them via pneumatic and/or hydraulic or mechanical means;
    producing a suspension of the functionalising particles is produced in a mixture of organic solvent and organic binder; and
    grafting of the functionalising particles on the support particles in the reactor by spraying the suspension on the support particles is carried out.

10. The method for producing the multimaterial powder according to claim 9, wherein:
    the reactor is a high-energy mechanical crusher type reactor;
    the support particles and the functionalising particles are introduced into the high-energy mechanical crusher type reactor;
    in the high-energy mechanical crusher type reactor, the grafting of the functionalising particles on the support particles in the high-energy mechanical crusher type reactor occurs by a mechanical action at a temperature between 0° C. and +150° C. is carried out.

11. The method for producing the multimaterial powder according to claim 10, wherein the temperature at which the grafting is carried out is between 10° C. and 80° C.

12. The method for producing the multimaterial powder according to claim 9, further comprising: heating and/or surface treating of the composite grains, using a circulating fluidised bed after grafting.

13. The method for producing the multimaterial powder according to claim 9, further comprising, in the case where the composite grains would not have a spherical morphology, spheroidizing the grains by a hot plasma fluidised bed.

* * * * *